US012610924B2

(12) United States Patent
Feltoon et al.

(10) Patent No.: US 12,610,924 B2
(45) Date of Patent: Apr. 28, 2026

(54) INSECT INFILTRATION PROTECTION APPARATUS FOR POLE MOUNTED BIRD FEEDER

(71) Applicant: DAZ Innovation Inc., Moorestown, NJ (US)

(72) Inventors: Zachary H Feltoon, Brooklyn, NY (US); Alan J Feltoon, Moorestown, NJ (US); Dianne V Feltoon, Moorestown, NJ (US)

(73) Assignee: DAZ Innovation Inc., Moorestown, NJ (US)

( * ) Notice: Subject to any disclaimer, the term of this patent is extended or adjusted under 35 U.S.C. 154(b) by 95 days.

(21) Appl. No.: 18/519,448

(22) Filed: Nov. 27, 2023

(65) Prior Publication Data

US 2024/0215546 A1     Jul. 4, 2024

Related U.S. Application Data

(60) Provisional application No. 63/436,943, filed on Jan. 4, 2023.

(51) Int. Cl.
A01K 39/01 (2006.01)
A01K 39/02 (2006.01)

(52) U.S. Cl.
CPC ...... A01K 39/0113 (2013.01); A01K 39/0206 (2013.01)

(58) Field of Classification Search
CPC ............ A01K 39/0113; A01K 39/0206; A01K 5/0142
USPC ..... 211/1.52, 53, 56, 58, 70, 77, 78, 95, 115
See application file for complete search history.

(56) References Cited

U.S. PATENT DOCUMENTS

| | | | |
|---|---|---|---|
| 2,779,311 A | 1/1957 | Hamilton | |
| 3,292,589 A | 12/1966 | Williams | |
| 3,301,220 A | 1/1967 | Queen | |
| 4,389,975 A * | 6/1983 | Fisher, Jr. .......... | A01K 39/0113 |
| | | | 119/52.3 |
| 4,627,543 A * | 12/1986 | Nicely ................ | A47B 57/265 |
| | | | 211/208 |
| 4,678,089 A * | 7/1987 | Lang ........................ | A47F 5/06 |
| | | | 211/205 |
| 5,042,192 A | 8/1991 | Osteen | |

(Continued)

FOREIGN PATENT DOCUMENTS

| | | |
|---|---|---|
| CA | 2698901 A1 | 10/2010 |
| CN | 201640185 U | 11/2010 |
| CN | 212164598 U | 12/2020 |

*Primary Examiner* — Marisa V Conlon
(74) *Attorney, Agent, or Firm* — Thompson Coburn LLP

(57) ABSTRACT

An insect infiltration protection apparatus for a bird feeder comprising a bushing and a reservoir. The reservoir has inner and outer rims with a dish-shaped body extending therebetween that has a bottom surface with the inner and outer rims projecting therefrom. The reservoir has a support surface defining a central through hole adjacent the inner rim, which frictionally engages the bushing such that the bushing supports the reservoir with the bottom surface of the dish-shaped body vertically below a peripheral edge of the outer rim. The bushing is made from a resilient material and has a central aperture dimensioned for a friction fit with a pole to support the reservoir on the pole at a height above the support surface with a liquid in the reservoir at a level below the inner and outer rims.

14 Claims, 8 Drawing Sheets

(56) References Cited

U.S. PATENT DOCUMENTS

| | | | |
|---|---|---|---|
| 5,148,626 | A | 9/1992 | Haake, Sr. |
| 5,458,243 | A * | 10/1995 | McBride ............ A47B 87/0261 |
| | | | 211/196 |
| 5,558,040 | A * | 9/1996 | Colwell ............... A01K 39/012 |
| | | | 119/52.2 |
| 6,123,206 | A * | 9/2000 | Zaremba ................. A47B 57/26 |
| | | | 211/205 |
| 6,167,840 | B1 | 1/2001 | White et al. |
| 6,729,070 | B1 | 5/2004 | Locke et al. |
| 6,792,891 | B1 | 9/2004 | Coburn et al. |
| 7,219,622 | B1 * | 5/2007 | Powers ................ A01K 5/0142 |
| | | | 119/51.5 |
| 7,793,461 | B2 | 9/2010 | Klein |
| 7,798,099 | B2 | 9/2010 | Vosbikian |
| 8,001,931 | B2 | 8/2011 | Deese et al. |
| 8,347,818 | B2 | 1/2013 | Cowger et al. |
| 8,413,605 | B2 | 4/2013 | Baynard et al. |
| 8,522,717 | B2 | 9/2013 | Carter et al. |
| 8,640,894 | B1 * | 2/2014 | Cronin ................... A47B 97/00 |
| | | | 211/205 |
| 9,801,357 | B2 | 10/2017 | Felknor |
| 10,779,526 | B1 | 9/2020 | Aaron et al. |
| 2004/0200130 | A1 | 10/2004 | Klein |
| 2005/0109247 | A1 * | 5/2005 | Nelson ................... A47B 37/04 |
| | | | 108/42 |
| 2006/0096545 | A1 | 5/2006 | Cone et al. |
| 2011/0073043 | A1 | 3/2011 | Dault |
| 2011/0214340 | A1 | 9/2011 | Klein |
| 2016/0309680 | A1 | 10/2016 | Blohm |
| 2022/0015335 | A1 | 1/2022 | Lorraine et al. |
| 2022/0295757 | A1 | 9/2022 | Hentschel |

* cited by examiner

INSECT INFILTRATION PROTECTION APPARATUS FOR POLE MOUNTED BIRD FEEDER

RELATED APPLICATION DATA

This application claims priority benefit to U.S. provisional application Ser. No. 63/436,943, filed Jan. 4, 2023, the disclosure of which is incorporated by reference herein.

BACKGROUND AND SUMMARY

This disclosure pertains to an insect infiltration protection apparatus, which may be used in connection with a bird feeder, for instance, a hummingbird feeder. It is known that ants and other insects typically crawl up a pole mounted bird feeder. For instance, ants crawl up a pole and contaminate nectar used in the hummingbird feeder. The disclosure is directed to a device that reduces the likelihood of such ant infiltration. In another aspect, the apparatus may provide an aesthetic ornamentation to an outdoor space, for instance, a bird bath regardless of whether used in connection with a bird feeder.

Figure 1:
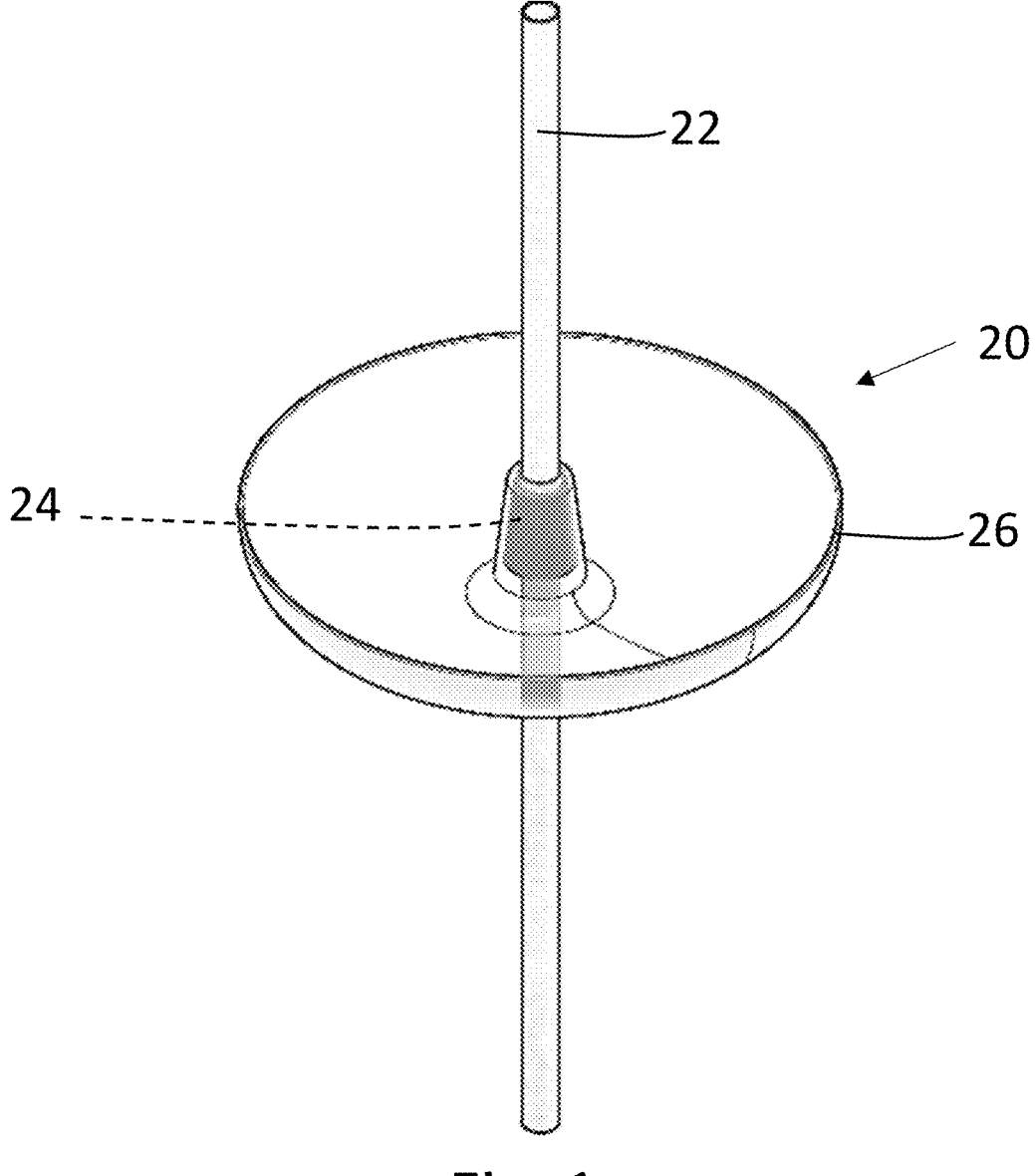
FIG. 1 is front isometric view of an insect infiltration protection apparatus for a bird feeder of the present disclosure.
Figures 2, 3:
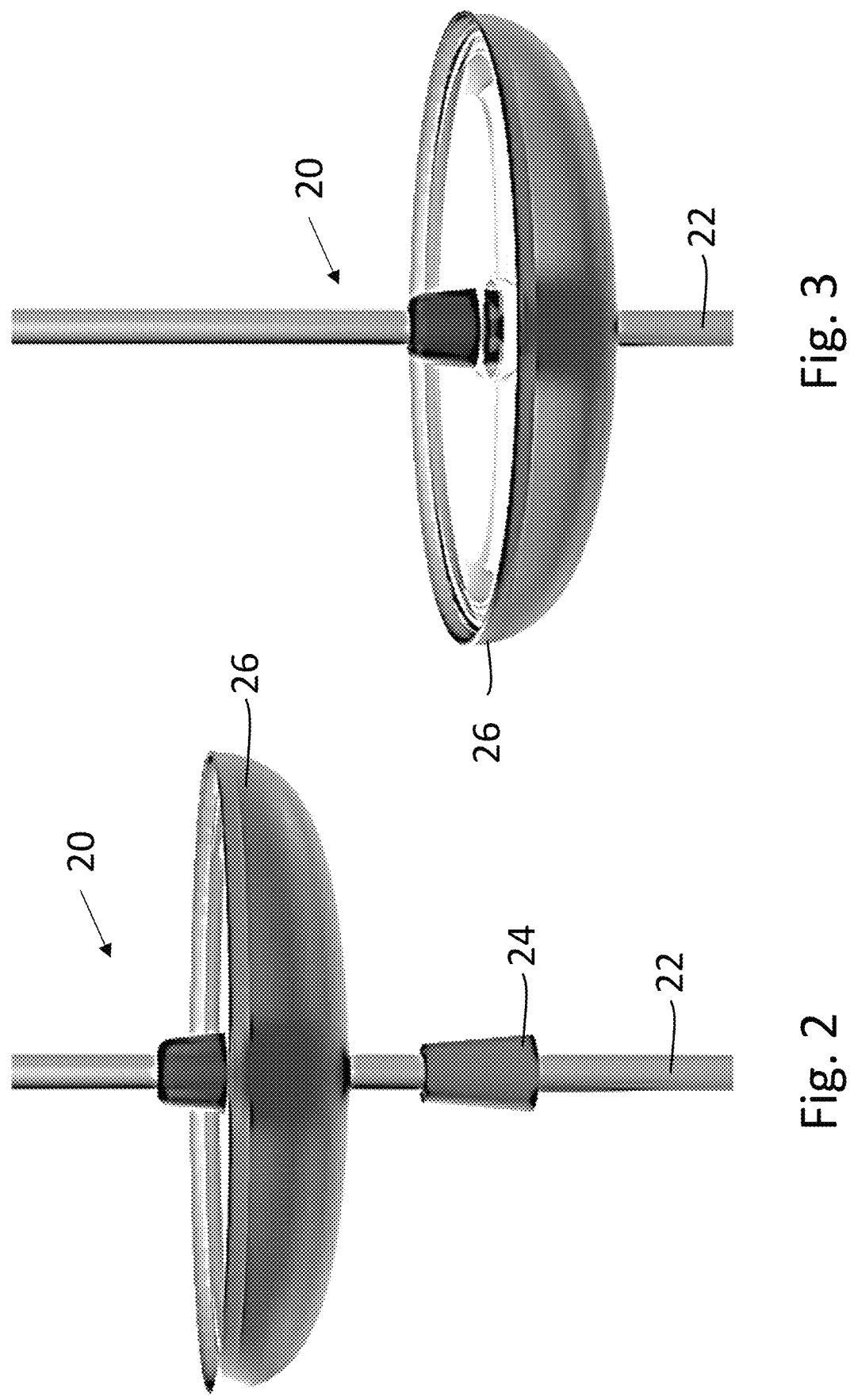
FIG. 2 is a front view of the insect infiltration protection apparatus of FIG. 1 as the reservoir is being placed on the bushing.
FIG. 3 is a front view of the insect infiltration protection apparatus of FIG. 1 as installed on the pole.
Figures 4, 5:
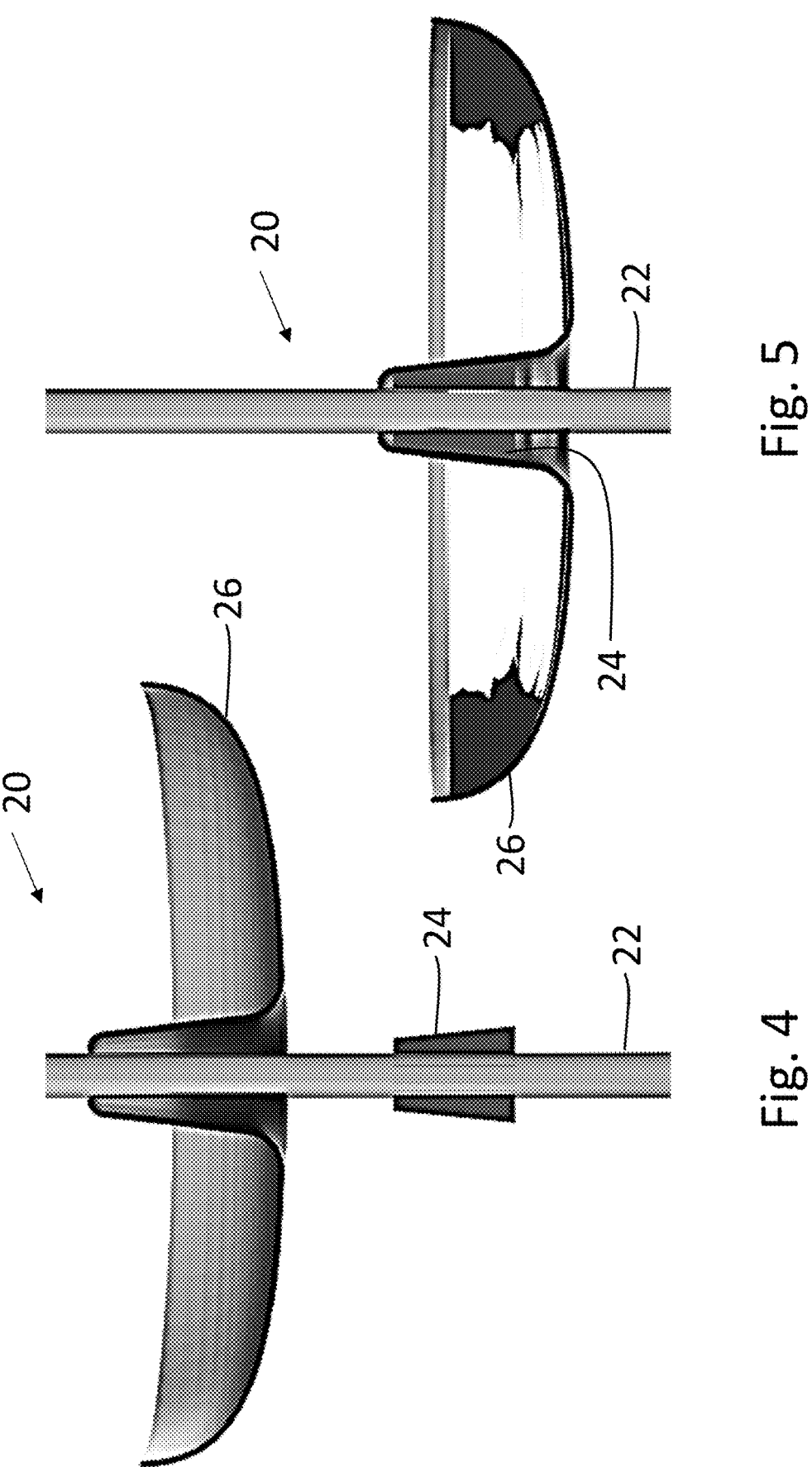
FIG. 4 is a cross-section view of FIG. 2.
FIG. 5 is a cross-section view of FIG. 3.
Figure 6:
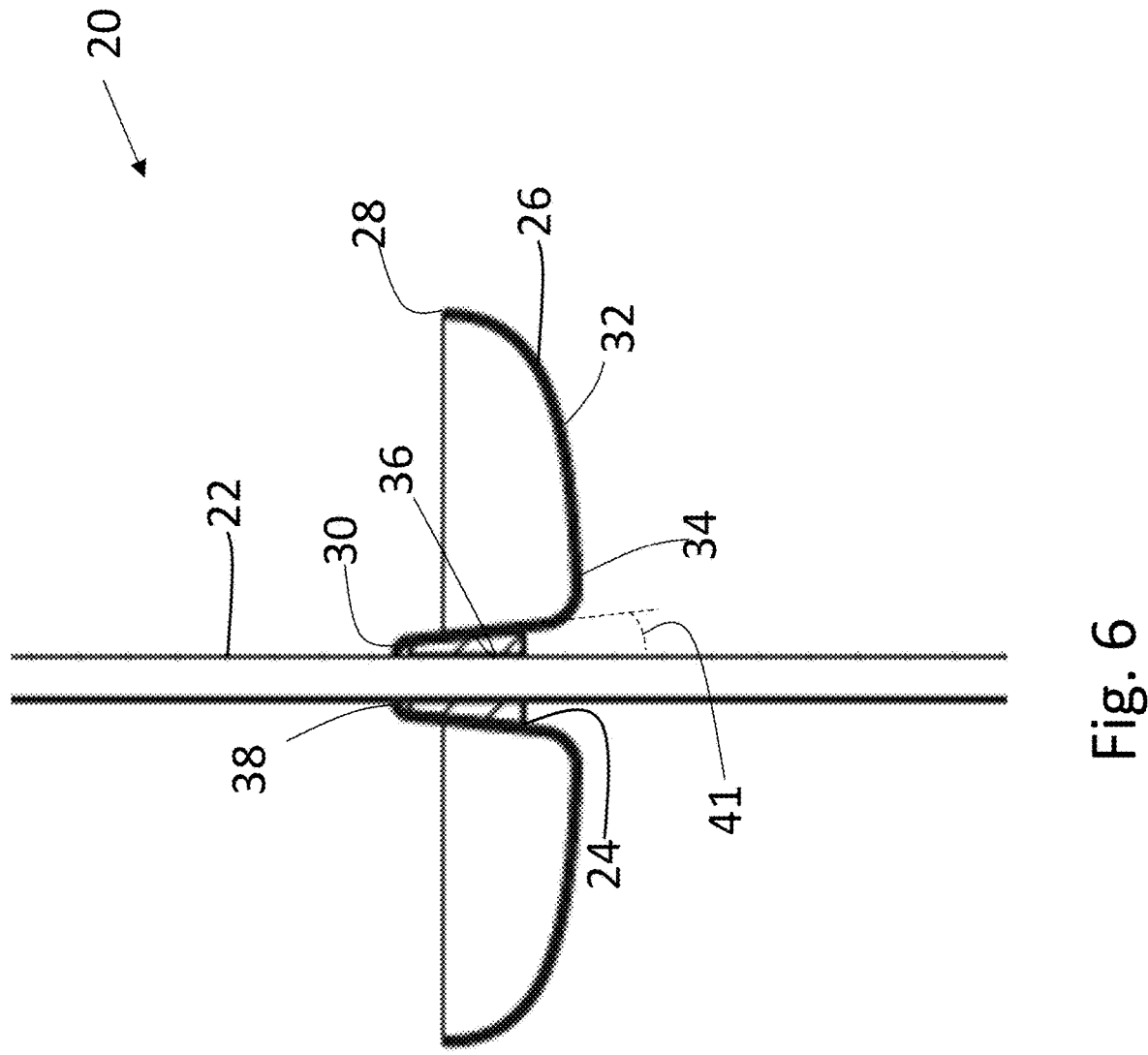
FIG. 6 is a cross section view of the ant moat of FIG. 1.
Figure 7:
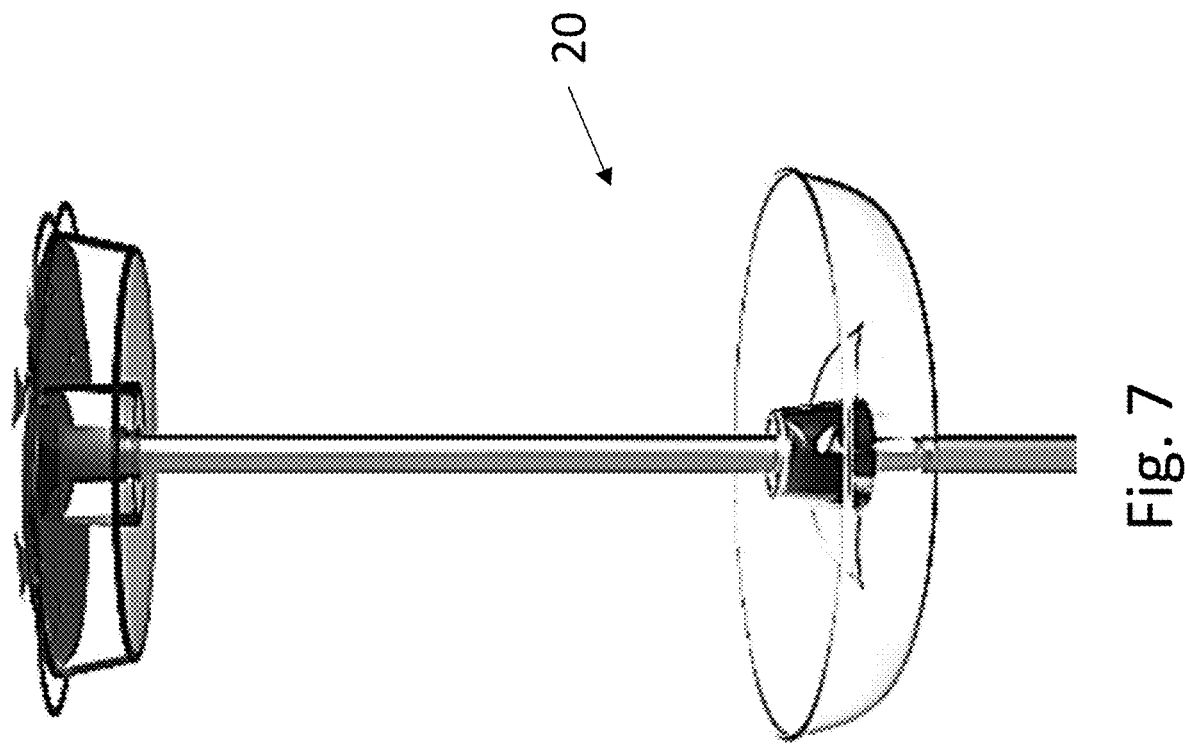
FIG. 7 is a front view of another embodiment of an insect infiltration protection apparatus of the present disclosure in conjunction with a hummingbird feeder.
Figures 8, 9, 10:
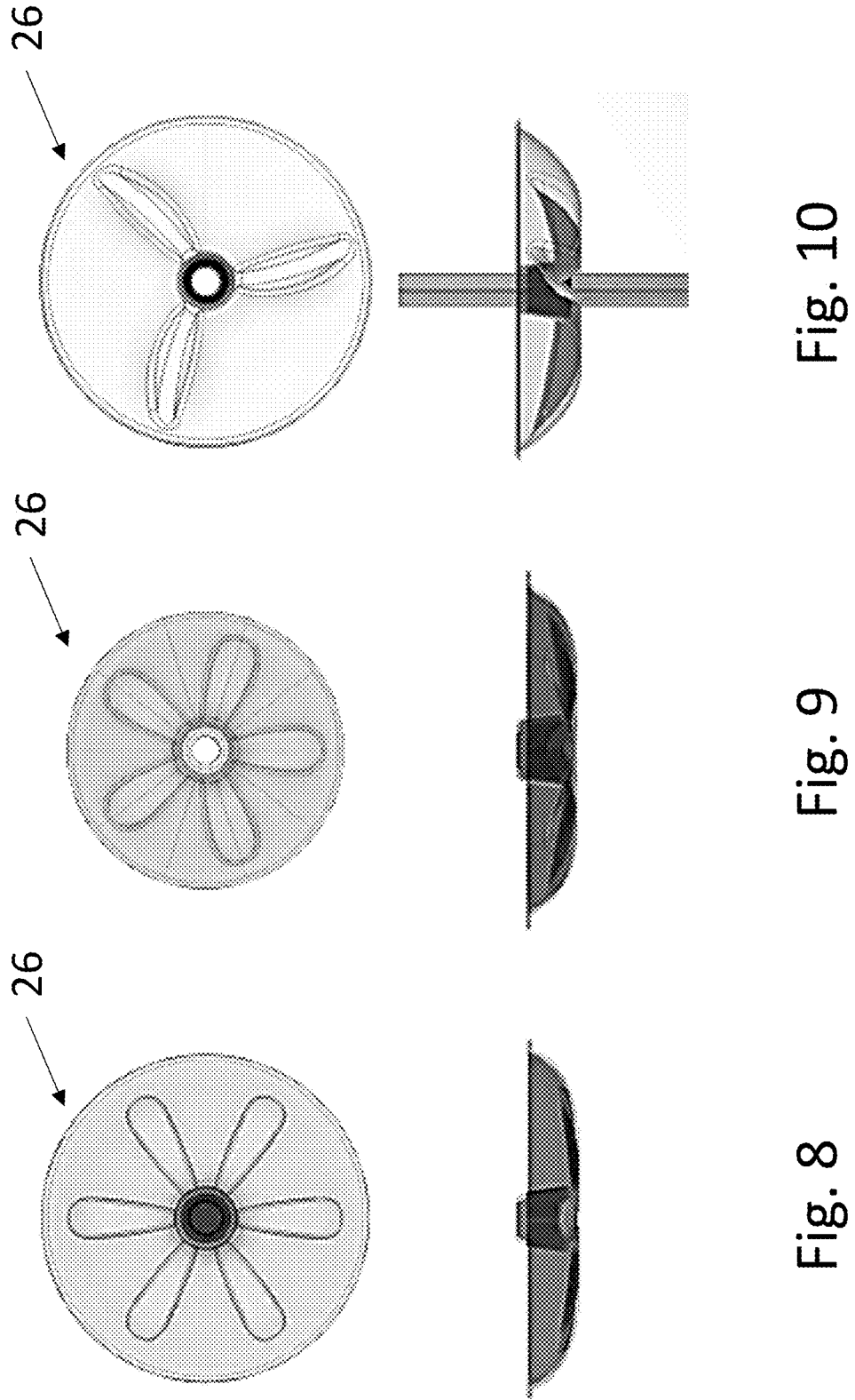
FIG. 8 is a view of another embodiment of an insect infiltration protection apparatus of the present disclosure with six strengthening gussets.
FIG. 9 is a view of another embodiment of an insect infiltration protection apparatus of the present disclosure with five strengthening gussets.
FIG. 10 is a view of another embodiment of an insect infiltration protection apparatus of the present disclosure with three strengthening gussets.
Figure 11:
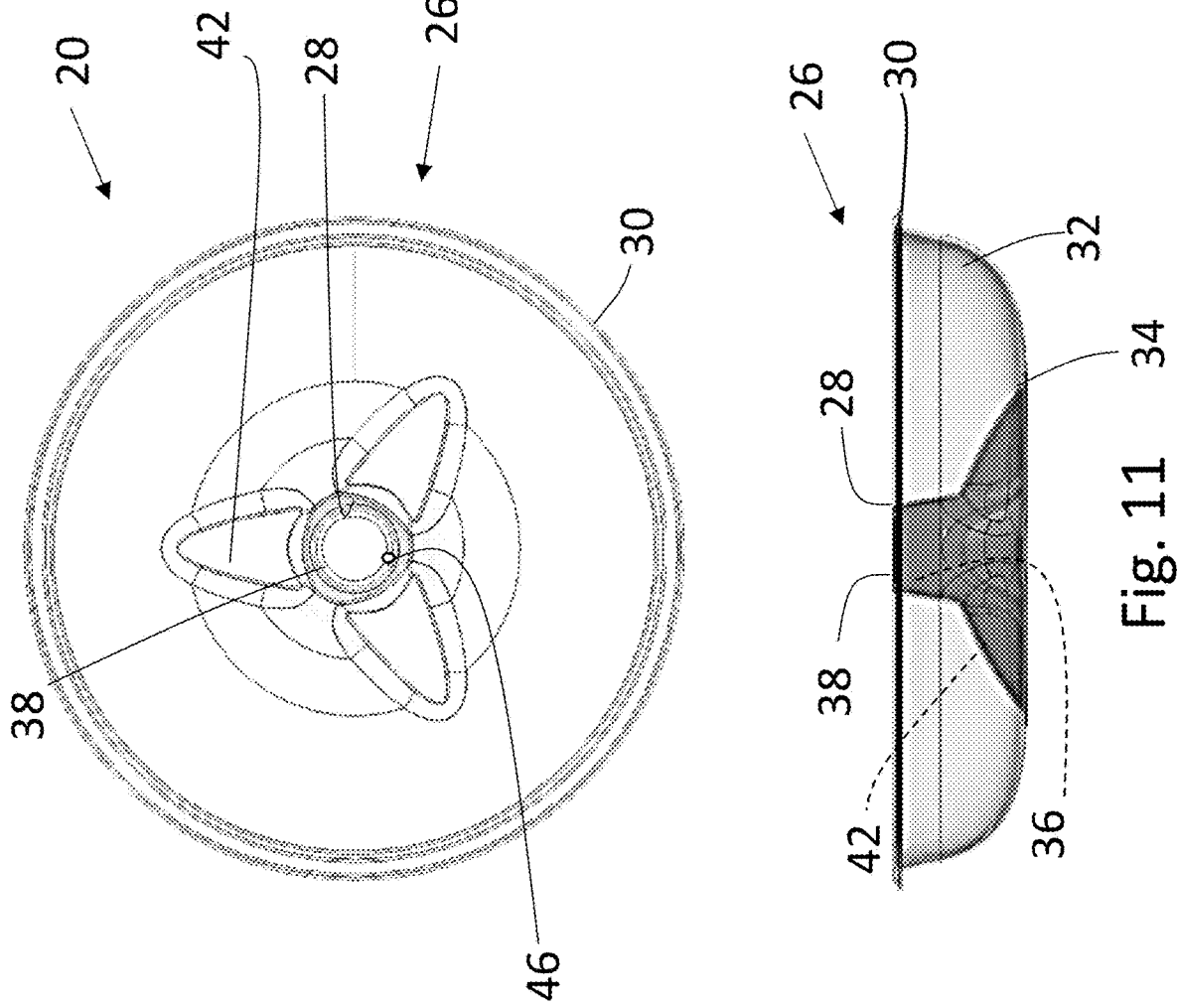
FIG. 11 is a view of another embodiment of an insect infiltration protection apparatus of the present disclosure with three strengthening gussets.
Figure 13:
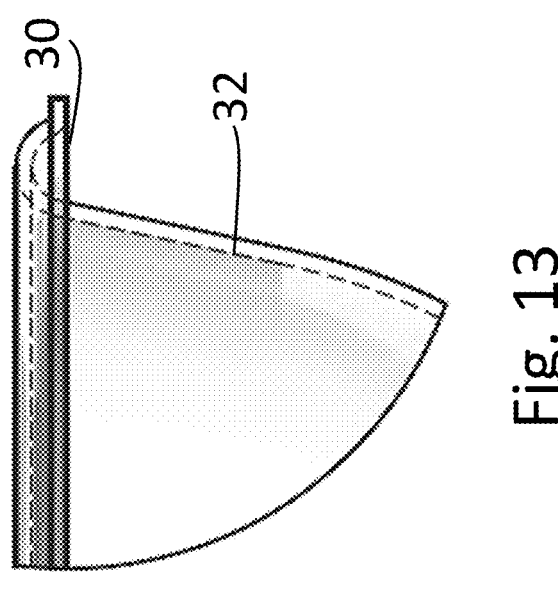
FIG. 13 is a magnified view of the outer rim of the insect infiltration protection apparatus of FIG. 12.
Figure 12:
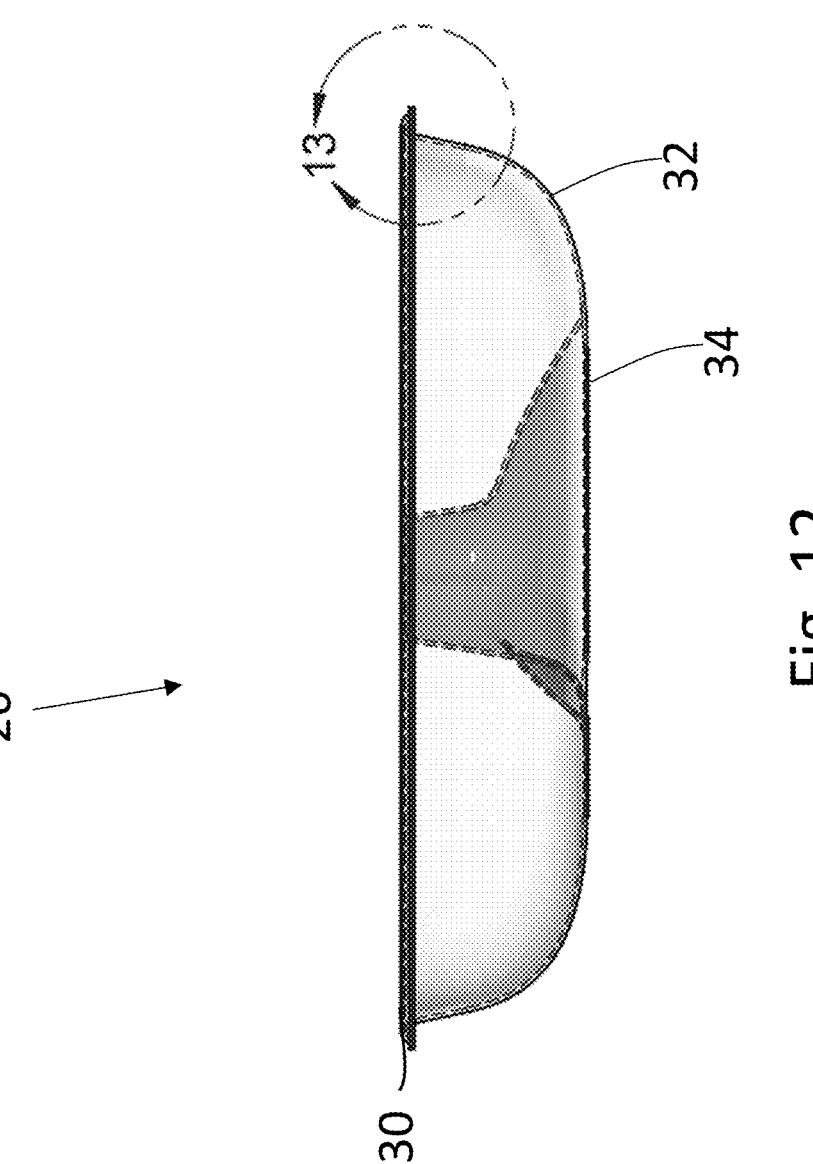
FIG. 12 is a front view of the insect infiltration protection apparatus of FIG. 11.

Reference numerals in the written specification and in the figures indicate corresponding items.

DETAILED DESCRIPTION

The exemplary insect infiltration protection apparatus is generally indicated by reference number 20. The insect infiltration protection apparatus 20 comprises a bushing 24 and a reservoir 26. In one aspect, the insect infiltration protection apparatus 20 may be mounted on a pole 22 which may be provided with the insect infiltration protection apparatus. In some applications, the insect infiltration protection apparatus 20 is used in connection with a bird feeder mounted on the end of the pole 22. The pole 22 is adapted to be supported in an upright manner from a support surface (not shown), for instance, the ground. The pole 22 may have any diameter. For instance, the pole 22 may have a diameter between 0.125 inches and 2.000 inches. In another aspect, the insect infiltration protection apparatus may be retrofitted onto an existing pole.

The reservoir 26 has an outer rim 28 and an inner rim 30 with a dish-shaped body 32 extending between the outer and inner rims. The dish-shaped body 32 has a bottom surface 34 with the outer rim 28 and inner rim 30 projecting from the bottom surface. Accordingly, the reservoir 26 may have at least three inflection points when viewed in a cross section taken through the vertical axis. The reservoir may have a diameter of about 5 to 12 inches, and a depth of about 1 to 3 inches. The reservoir 26 has a support surface 36 defining a central through hole 38 adjacent the inner rim 30. The reservoir may be designed for easy cleaning. The support surface 36 frictionally engages the bushing 24 in a manner such that the bushing supports the reservoir 26 with the bottom surface 34 of the dish-shaped body 32 vertically below a peripheral edge 40 of the outer rim 28. The support surface 36 of the reservoir may be cylindrical or frusto-conically shaped. For example, the support surface may be a cylindrical bore or it may be angled with a taper having an angle 41 extending outward to about 45°. A taper angle 41 of about 2° to about 15° may be used.

The reservoir 26 may further comprise a plurality of strengthening gussets 42 formed in the body 32. Each of the plurality of strengthening gussets 42 may extend radially outward from the support surface 36 adjacent the through hole 38. The body 32 may comprise between two and eight strengthening gussets 42. The reservoir 26 may comprise a minimum liquid level indicator (not shown), which corresponds to the minimum volume of liquid necessary to prevent ants from traversing the reservoir 26. In that regard, the reservoir 26 may be adapted and configured to retain a liquid volume of at least 4 fluid ounces. The peripheral edge 40 of the outer rim 28 of the reservoir may be curved toward the bottom surface of the dish-shaped body. The reservoir 26 may comprise a polymer, which may be opaque, translucent or transparent. The polymer may be chosen to maximize at least the following features: UV stabilization, longevity, clarity, texture, strength, and weather resistance. The reservoir 26 may also be metallic or other suitable material.

The bushing 24 may be made from a resilient material such as natural or synthetic rubber. The bushing may also be a member that mechanically attaches to the pole, for instance, a two piece clamp that may be tightened around the pole. The bushing 24 has a central aperture 44 dimensioned for a friction fit with the pole 22 sufficient to permit the bushing to support the reservoir 26 on the pole at a height above the support surface (now shown) with a liquid retained in the reservoir at a liquid level below the inner rim 30 and the outer rim 28 of the reservoir. The bushing central aperture 44 may be such that the bushing may be adjustably set to a desired height on the pole. The central aperture 44 may be shaped, sized, dimensioned (in diameter and length) for a friction fit with the pole sufficient to permit the bushing to support the reservoir on the pole at a height above the support surface with a liquid retained in the reservoir at a liquid level below the inner rim and the outer rim of the reservoir. In one aspect, the central aperture may have a slight interference fit with the pole such that pressing the bushing on the pole expands the central aperture and biases the bushing against the pole in an manner to permit the bushing to support the reservoir on the pole at a height above the support surface with a liquid retained in the reservoir at a liquid level below the inner rim and the outer rim of the reservoir. In another aspect, the bushing may also be incorporated into the pole and monolithically or integrally formed with the pole.

The bushing 24 is also shaped to frictionally engage the support surface of the reservoir and to orient the reservoir with the bottom surface of the dish-shaped body below a peripheral edge of the outer rim such that the dish-shaped body retains a liquid at a liquid level below the inner rim and the outer rim of the reservoir. The bushing 24 may have a complementary shape to the support surface and may be cylindrical or it may have a taper with an angle extending outward to about 45°. A taper angle of about 2° to about 15° may be used. Adjacent to the support surface and the inner rim of the reservoir, a small air gap or passageway 46 may be provided. When the reservoir is placed on the top of the bushing, the air gap 46 allows any air trapped between the bushing and the reservoir to escape and thus allows the person installing the assembly to exert pressure upward on the bushing and downward on reservoir to lock the reservoir and bushing together in place on the pole.

Accordingly, the insect infiltration protection device in essence comprises one or two parts that may be assembled on a pole with no tools, adhesives, or mechanical fasteners. The shape of the insect infiltration protection device reduces the likelihood that insects will be able to pass from under the reservoir upward on the pole to the bird feeder. The shape of insert infiltration protection device may be arranged to provide an aesthetic ornamentation for an outdoor space, and it may be shaped to provide a bird bath feature for a pole mounted bird feeder.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An insect infiltration protection apparatus for a bird feeder comprising:
    a pole adapted to be supported in an upright manner from a pole supporting base;
    a solid bushing made from a resilient material, the bushing having an exterior with a taper and a central aperture, the resilient material of the bushing extending continuously around the central aperture and extending continuously radially outward from the central aperture to the exterior taper to form a solid bushing; and a reservoir, the reservoir having an outer rim and an inner rim with a dish-shaped body extending between the outer and inner rims, the dish-shaped body having a bottom surface with the outer rim and the inner rim projecting from the bottom surface, the inner rim projecting from the bottom surface a greater distance than the outer rim such that inner rim is vertically above the outer rim, the reservoir having a support surface defining a central through hole adjacent the inner rim, the support surface having an interior including a taper, the taper of the interior of the support surface matching the taper of the exterior of the bushing and frictionally engaging with the taper of the exterior of the bushing in a manner such that the matching tapers of the interior of the support surface and the exterior of the bushing support the reservoir with the bottom surface of the dish-shaped body vertically below a peripheral edge of the outer rim; and
    wherein the bushing central aperture is adapted and configured for an interference, friction fit with the pole such that pressing the bushing on the pole expands the central aperture and biases the bushing against the pole in a manner sufficient to permit the bushing to support the reservoir on the pole at a height above the pole supporting base—with a liquid retained in the reservoir at a liquid level below the inner rim and the outer rim of the reservoir; and
    wherein the taper of the interior of the support surface extends from a flat portion of the support surface adjacent to the inner rim, and the taper of the interior of the support surface and the matching the taper of the exterior of the bushing frictionally engage and support the reservoir on the pole with a space between a top of the bushing and the flat portion of the interior of the support surface.

2. The insect infiltration protection apparatus of claim 1 wherein the body of the reservoir further comprises a plurality of strengthening gussets formed in the body, each of the plurality of strengthening gussets extending radially outward from the support surface adjacent the through hole.

3. The insect infiltration protection apparatus of claim 1 wherein the peripheral edge of the outer rim is curved toward the bottom surface of the dish-shaped body.

4. The insect infiltration protection apparatus of claim 3 wherein the pole has a vertical axis, the reservoir having at least three inflection points when viewed in a cross section taken through the vertical axis.

5. The insect infiltration protection apparatus of claim 1 wherein the reservoir comprises one of a polymer and metallic material.

6. The insect infiltration protection apparatus of claim 1 wherein the reservoir is one of translucent, transparent and opaque.

7. The insect infiltration protection apparatus of claim 1 wherein the pole has a diameter between 0.125 inches and 2.00 inches.

8. The insect infiltration protection apparatus of claim 1 wherein the reservoir is adapted and configured to retain a liquid volume of at least 4 fluid ounces.

9. An insect infiltration protection apparatus for a bird feeder comprising a reservoir and a bushing, the reservoir having an outer rim and an inner rim with a dish-shaped body extending between the outer and inner rims, the dish-shaped body having a bottom surface with the outer rim and the inner rim projecting from the bottom surface, the inner rim projecting from the bottom surface at a greater distance than the outer rim such that the inner rim is vertically above the peripheral edge of the outer rim, the reservoir having a support surface defining a central through hole adjacent the inner rim, the bushing being made of a resilient material, the bushing having an exterior with a taper and a central aperture, the resilient material of the bushing extending continuously around the central aperture and extending continuously radially outward from the central aperture to the exterior taper to form a solid bushing, the central aperture of the bushing being adapted and configured for an interference, friction fit with a pole such that the central aperture expands and biases the bushing against the pole and is sufficient to permit the bushing to support the reservoir on a pole at a height above a pole supporting base by which the pole is supported with a liquid retained in the reservoir at a liquid level below the inner rim and at a level equal to or below the outer rim of the reservoir, the support surface of the reservoir having an interior with a taper, the taper of the interior of the support surface of the reservoir matching the taper of the exterior of the bushing, the taper of the interior of the support surface extending from a flat portion of the support surface adjacent to the inner rim, wherein when the reservoir is assembled with the bushing and the reservoir and the bushing are mounted on a pole, the taper of the exterior of the bushing frictionally engages with the taper of the interior of the support surface of the reservoir to support the reservoir on the bushing with a space between the bushing and the flat portion of the interior of the support surface and with the bottom surface of the dish-shaped body below a peripheral edge of the outer rim with the dish-shaped body retaining a liquid at a liquid level below the inner rim and at or below the outer rim of the reservoir.

10. The insect infiltration protection apparatus of claim 9 wherein the outer rim is curved toward the bottom surface of the dish-shaped body.

11. The insect infiltration protection apparatus of claim 9 wherein the reservoir comprises one of a polymer and metallic material.

12. The insect infiltration protection apparatus of claim 9 wherein the reservoir is one of translucent, transparent and opaque.

13. The insect infiltration protection apparatus of claim 9 wherein the reservoir is adapted and configured to retain a liquid volume of at least 4 fluid ounces.

14. The insect infiltration protection apparatus of claim 9, wherein the taper of the interior of the support surface of the reservoir and the taper of the exterior of the bushing have a complementary angle extending to about 45 degrees.

* * * * *